United States Patent
Gerstenberger

(10) Patent No.: US 6,222,636 B1
(45) Date of Patent: Apr. 24, 2001

(54) DISK-BASED IMAGE STORAGE SYSTEM INVENTION DISCLOSURE

(75) Inventor: Jeffrey S. Gerstenberger, Rochester, NY (US)

(73) Assignee: Nek Press Solutions LLC, Rochester, NY (US)

( * ) Notice: Subject to any disclaimer, the term of this patent is extended or adjusted under 35 U.S.C. 154(b) by 0 days.

(21) Appl. No.: 09/133,826

(22) Filed: Aug. 13, 1998

(51) Int. Cl.[7] .................................................. G06F 15/00
(52) U.S. Cl. .......................................... 358/1.15; 358/1.16
(58) Field of Search ................................ 358/1.15, 1.16, 358/1.17, 1.18, 1.13, 1.1, 404, 444, 426, 1.5, 1.6, 468; 382/232, 233, 305; 709/247; 345/521

(56) References Cited

U.S. PATENT DOCUMENTS

| | | | |
|---|---|---|---|
| 4,949,190 | * 8/1990 | Thompson | 358/426 |
| 5,047,955 | * 9/1991 | Shope et al. | 358/1.17 |
| 5,130,809 | 7/1992 | Takayanagi | 358/444 |
| 5,142,667 | 8/1992 | Dimperio et al. | 395/115 |
| 5,170,263 | 12/1992 | Hisatake et al. | 358/426 |
| 5,367,383 | * 11/1994 | Godshalk et al. | 358/404 |
| 5,375,202 | 12/1994 | May et al. | 395/164 |
| 5,384,646 | * 1/1995 | Godshalk et al. | 358/444 |
| 5,420,696 | 5/1995 | Wegeng et al. | 358/408 |
| 5,495,339 | 2/1996 | Stegbauer et al. | 358/444 |
| 5,611,024 | 3/1997 | Campbell et al. | 395/114 |
| 5,808,747 | 9/1998 | Telle | 358/444 |
| 5,848,226 | 12/1998 | Chen et al. | 395/114 |

* cited by examiner

Primary Examiner—Dov Popovici
(74) Attorney, Agent, or Firm—James D. Leimbach

(57) ABSTRACT

A printer apparatus includes a marking engine subsystem that records information on an image recording member. An image storage subsystem buffers image data for output to the marking engine subsystem. The image storage subsystem includes an input for receiving rasterized image data. A data compressor operates on the rasterized image data to compress the rasterized image data to form compressed image data. A disk storage module receives, stores and outputs the compressed image data to a semiconductor RAM memory device that stores at least one page of the compressed data. A data decompressor operates on the compressed data output by the RAM memory device and decompresses the compressed data to rasterized data for output to the marking engine subsystem. A RAM controller controls the RAM memory device for outputting the compressed data from the RAM memory device to the decompressor. The disk storage module outputs compressed data to the RAM memory device at a data rate greater than the maximum sustainable data recording rate of the marking engine subsystem.

31 Claims, 3 Drawing Sheets

DISK-BASED IMAGE STORAGE SYSTEM INVENTION DISCLOSURE

FIELD OF THE INVENTION

The invention is directed to a method and apparatus for storing images (rasters) on one or more disk drives for subsequent printing on a high-speed copier or printer. Compressed images are stored in a disk storage module that minimizes the disk transfer bandwidth required while optimizing overall system throughput.

BACKGROUND OF THE INVENTION

High-speed digital copiers and printers require temporary storage for images prior to printing them. This image storage subsystem serves two important purposes. First, it decouples the speed at which input images are acquired (scanned or rasterized) from the speed at which they are printed. Second, the temporary storage allows multiple copies of a document to be produced without having to re-acquire the input images; i.e., rescan the document or in the case of an input from a computer rerasterize the data from a coded form or object form used in a page description language. For high-volume printing, where multiple sets of large documents need to be produced, the temporary storage is most economically implemented using disk drives. Compressing the images before they are stored on the disks can further increase the capacity of the temporary storage.

A system using disk drives to store images prior to printing them is disclosed in U.S. Pat. No. 5,142,667 to Dimperio et al. The patent describes a system which uses several disk drives to implement a disk memory which is used to store images prior to subsequent processing or printing. Dimperio et al. describe various experiments and algorithms for determining the throughput of the system based on the disk bandwidth, but do not determine the minimum disk bandwidth required for full output productivity.

U.S. Pat. No. 5,495,339 to Stegbauer et al. similarly discloses a disk memory for image storage. This patent also discloses the use of a resource manager to schedule the use of the disk drives. Since the disclosed system may not have sufficient disk bandwidth to read images in time to optimally print them, the resource manager determines when it is necessary to reduce output productivity by inserting a print pitch skip. A similar resource management approach is disclosed by May et al. in U.S. Pat. No. 5,375,202. Both of these resource managers require predicting when a series of disk access operations will be completed in the future. Such predictions are difficult to make given the variability of disk access times and the inability to predict when disk soft errors will occur.

A system that uses image compression in conjunction with a disk memory is disclosed in U.S. Pat. No. 5,130,809 to Takayanagi. By using a compression algorithm that operates at a constant compression rate, the size of the image is reduced and the disk bandwidth required to store the image is similarly reduced. However, to achieve the constant compression rate disclosed by Takayanagi, a non-lossless compression algorithm, such as block approximation or adaptive prediction coding, must be used. This results in reduced image quality when the image is subsequently printed, since the decompressed image is not identical to the original input image.

U.S. Pat. No. 5,611,024 to Campbell et al. discloses the use of a lossless image compression algorithm to reduce the amount of memory required to store an image. The compressed images are stored in solid-state memory that is intended to store only a small number of pages. The system disclosed by Campbell et al. does not use disk drives to achieve the capacity required for high-volume printing in which large numbers of images must be stored to maximize output productivity. Without using disk drives, the images would have to be stored in solid-state memory, which is considerably more expensive.

SUMMARY OF THE INVENTION

It is an object of the invention to optimize overall printing system performance by maximizing the output productivity of the marking engine. Therefore, the disk storage module is able to provide data at the rate required to keep the marking engine running at full capacity for any sequence of images printed on the printing system.

Another object of the invention is to efficiently maximize the number of images that can be stored in the image storage subsystem. Therefore, the images are compressed before they are placed in the disk storage module, and decompressed before they are needed for further image processing or printing.

Yet another object of the invention is to provide a means to load images into the image storage subsystem at substantially the same time images are being retrieved for processing or printing. Operation in this manner prevents the image storage subsystem from restricting the flow of images through the printing system and enables the overall performance of the printing system to be maximized.

Briefly, the invention is directed to an electronic image storage subsystem that is part of a larger printing system. The image storage subsystem provides temporary storage for images prior to subsequent processing or printing. The subsystem is based on a disk storage module which stores compressed images until they are needed. The disk storage module has an aggregate bandwidth sufficient for printing worst-case compressed images at the full rated speed of the marking engine.

In accordance with a first aspect of the invention there is provided a printer apparatus comprising a marking engine subsystem for recording information on an image recording member at a maximum sustainable data recording rate; and an image storage subsystem for buffering image data for output to the marking engine subsystem, the image storage subsystem including an input for receiving rasterized image data a data compressor that operates on the rasterized image data to compress the rasterized image data to form compressed image data a disk storage module that receives, stores and outputs the compressed image data a semiconductor RAM memory device that stores at least one page of the compressed data a data decompressor that operates on the compressed data output by the RAM memory device and decompresses the compressed data to decompressed rasterized image data for output to the marking engine subsystem; and a RAM controller that controls the RAM memory device for outputting the compressed data from the RAM memory device to the decompressor, the disk storage module outputting compressed data to the RAM memory device at a data rate fast enough so that when the data is decompressed the decompressed rasterized image data is available to the marking engine to operate at the maximum sustainable recording rate of the marking engine subsystem.

In accordance with a second aspect of the invention there is provided a method of operating an image storage subsystem for output of image data to a marking engine subsystem for recording information on an image recording member at a maximum sustainable data recording rate, the method comprising inputting rasterized image data to a data compressor device, a compressing the rasterized image data to form compressed image data, a storing the compressed image data in a disk storage module, outputting the compressed image data from the disk storage module to a semiconductor RAM memory device that stores at least one page of the compressed image data and decompressing the compressed data to decompressed rasterized data for output to the marking engine subsystem. The disk storage module outputs compressed image data to the RAM memory device at a data rate fast enough so that when the data is decompressed the decompressed rasterized image data is available to the marking engine so as to allow the marking engine to operate at the maximum sustainable data recording rate of the marking engine subsystem.

DESCRIPTION OF THE PREFERRED EMBODIMENT

General System Architecture

Figure 1:
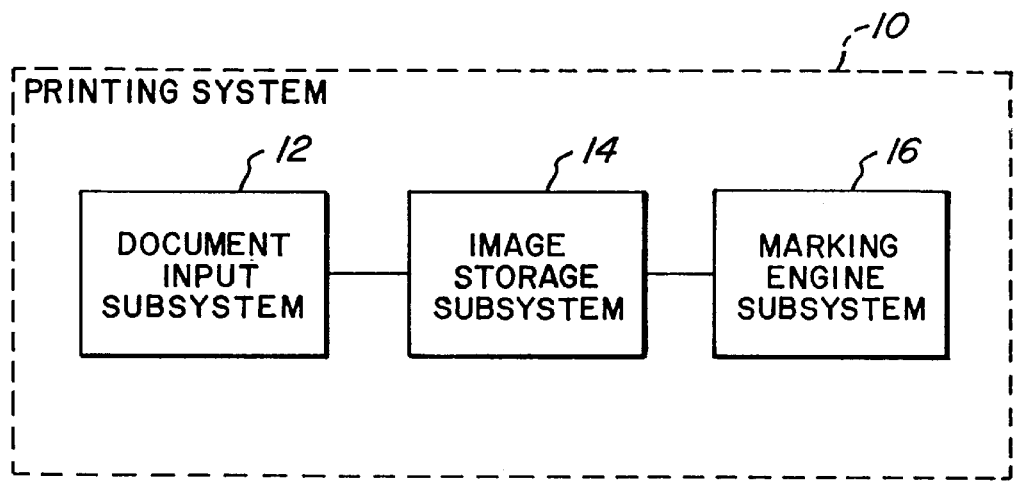
FIG. 1 shows the high-level architecture of the printing system according to the invention.

Referring to FIG. 1, the printing system 10 contains three primary subsystems. The document input subsystem 12 provides one or more devices for submitting documents to the printing system 10. Documents can be input through mechanisms such as a document scanner for copier operation or a raster image processor (RIP) capable of converting page description language into rasters for networked printer operation. An example of an input system is described in commonly assigned U.S. application Ser. No. 08/655,550 filed in the name of Telle. now U.S. Pat. No. 5,808,747, issued on Sep. 15, 1998. A scanner scans a document and converts the image information thereon to raster information or data that can be expressed as a digital signal. Once the raster image data has been acquired by the system, it is transferred to the image storage subsystem 14. When the document is ready to be printed, images are retrieved from the image storage subsystem 14 and sent to the marking engine subsystem 16. The marking engine subsystem 16 includes the mechanical and electrical components necessary to produce the physically marked pages of output. Examples of marking engines are electrophotographic devices, electrographic devices, thermal dye transfer devices, inkjet devices, photographic devices that record on a photographic member using an electro-optical exposure device or other spatial light modulator, magnetic recording devices, etc. Common to many of these various types of marking engine subsystems is the requirement that once a sheet of paper or film has been physically fed into the paper path or other path to be marked, the image data for that sheet must be delivered to the printhead at precisely the correct time. Otherwise, the sheet will be marked incorrectly. Consequently the image storage subsystem 14 and the marking engine subsystem 16 must be tightly coupled. In addition to the image data that is passed from the image storage subsystem 14 to the marking engine subsystem 16, timing and control information must also be communicated between the two subsystems.

Figure 2:
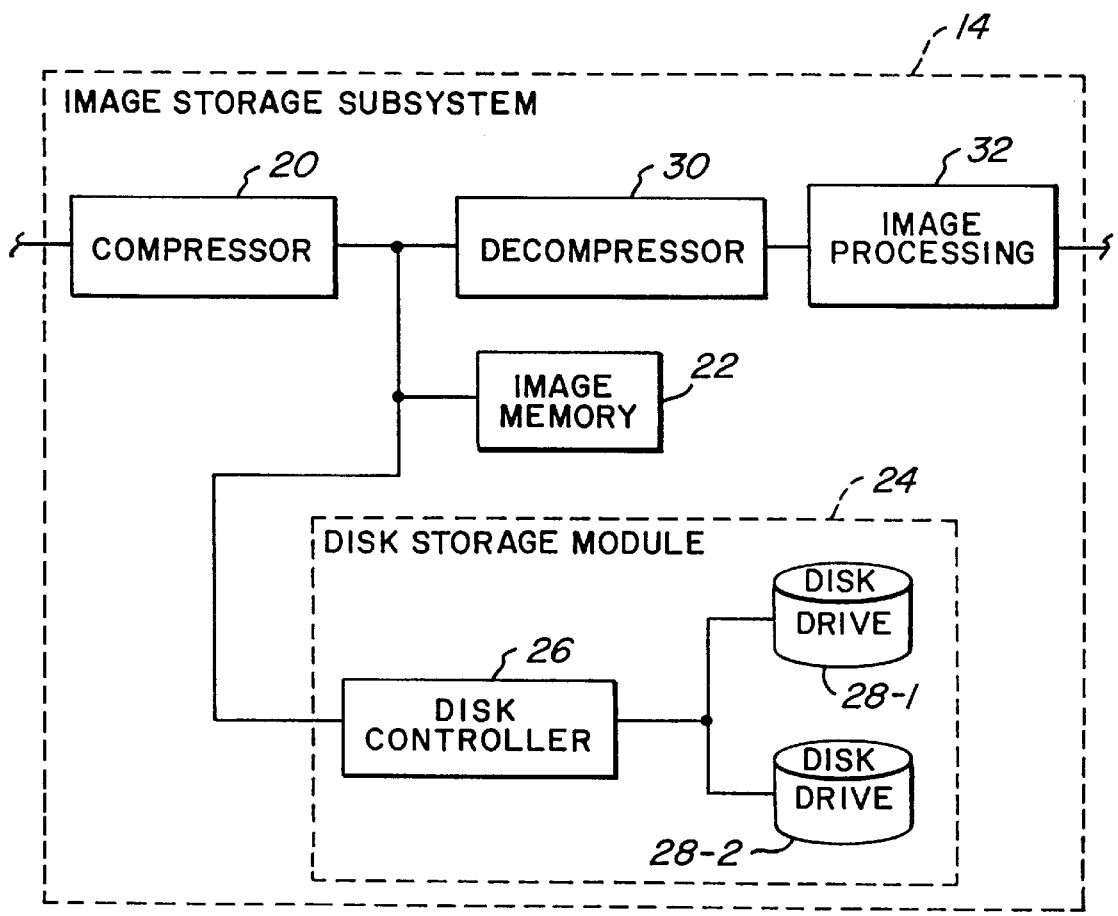
FIG. 2 shows the high-level image data path of the image storage subsystem according to the invention.

The internal image data path for the image storage subsystem 14 is shown in FIG. 2. Images are acquired by the document input subsystem 12 and then sent to the image storage subsystem 14 where they are compressed by the image compressor 20 using a lossless image compression algorithm. The particular compression algorithm used is not significant to the invention, and algorithms such as Lempel-Ziv, Group 4 FAX, or other lossless compression algorithm can be used. A lossless compression algorithm is used so that the original input image is exactly reproduced when the image is decompressed. The compressed image data is then transferred to the image memory 22 which is DRAM semiconductor memory, typically using direct memory access (DMA) transfers. Other semiconductor memory may also be used such as synchronous DRAM (SDRAM) or static random access memory (SRAM). The image memory 22 serves as a temporary storage location for the compressed image data before it is transferred to the disk storage module 24. Storing the compressed data in the image memory 22 serves two purposes. First, it provides a location to place the compressed image data in the event that the disk storage module 24 is currently busy performing another data transfer. Second, it allows the complete image to be compressed before it is transferred to the disk storage module 24. This means that the size of the complete compressed image will be known before the compressed image data is written to the disk drives 28 in the disk storage module 24. This simplifies the allocation of storage space on the disk drives 28.

Once the compressed image data is in the image memory 22, it can be transferred to the disk storage module 24. The disk storage module 24 comprises of at least one disk controller 26 and at least one disk drive 28. The disk controller 26 is typically an application specific integrated circuit that interfaces to one of the standard disk interfaces such as SCSI or IDE/ATA. The transfer from image memory 22 to the disk controller 26 is typically accomplished by a DMA engine contained within the disk controller 26. The transfer rate between the disk storage module 26 and the image memory 22 is an important factor in the overall performance of the image storage subsystem 14. Consequently, it may be desirable to increase the bandwidth within the disk storage module 24 by using multiple disk drives. For example, FIG. 2 shows a disk storage module configuration that utilizes one disk controller 26 to interface to two disk drives 28-1 and 28-2. However the invention contemplates that bandwidth can generally be improved by using multiple disk drives and multiple disk controllers.

Once the compressed image data has been written into the disk storage module 24, the process of loading an image into the image storage subsystem 14 is complete. The compressed image data in the image memory 22 is no longer needed and that area of the image memory 22 can be overwritten to store another image.

When the marking engine subsystem 16 is ready to print an image, the image must first be retrieved from the disk storage module 24. As the compressed image data is read off of the disk drive(s) 28, the DMA engine in the disk controller 26 transfers the data to the image memory 22. Data coming off of the disk drives 28 does not necessarily flow continuously due to delays when the disk heads seek from one track to another. Once again the image memory 22 serves as a temporary buffer for the compressed image data. The advantage of this temporary buffer is that it decouples the disk storage module data transfers from the data transfers to the decompressor 30.

Once the compressed image data is located in image memory 22 and the marking engine subsystem 16 is ready to print the image, the decompressor 30 begins decompressing the image data. The compressed image data is typically transferred from the image memory 22 to the decompressor 30 using DMA accesses. The decompressor 30 uses the corresponding algorithm to that used by the compressor 20 to restore the image to its original content as received from the document input subsystem 12.

The decompressed image data is subsequently sent to the image processing block 32, where additional image processing operations can be performed. These operations include altering the image content, such as adding annotations. Other operations that may be performed here are the addition of white space for margins or shifting the image within the print frame. Additionally, resolution enhancement or printing process correction algorithms may be performed at this point. The resultant image is then transferred to the marking engine subsystem 16 where the data is used to appropriately mark the sheet being printed.

DETAILED DESCRIPTION OF THE PREFERRED EMBODIMENT

Figure 3:
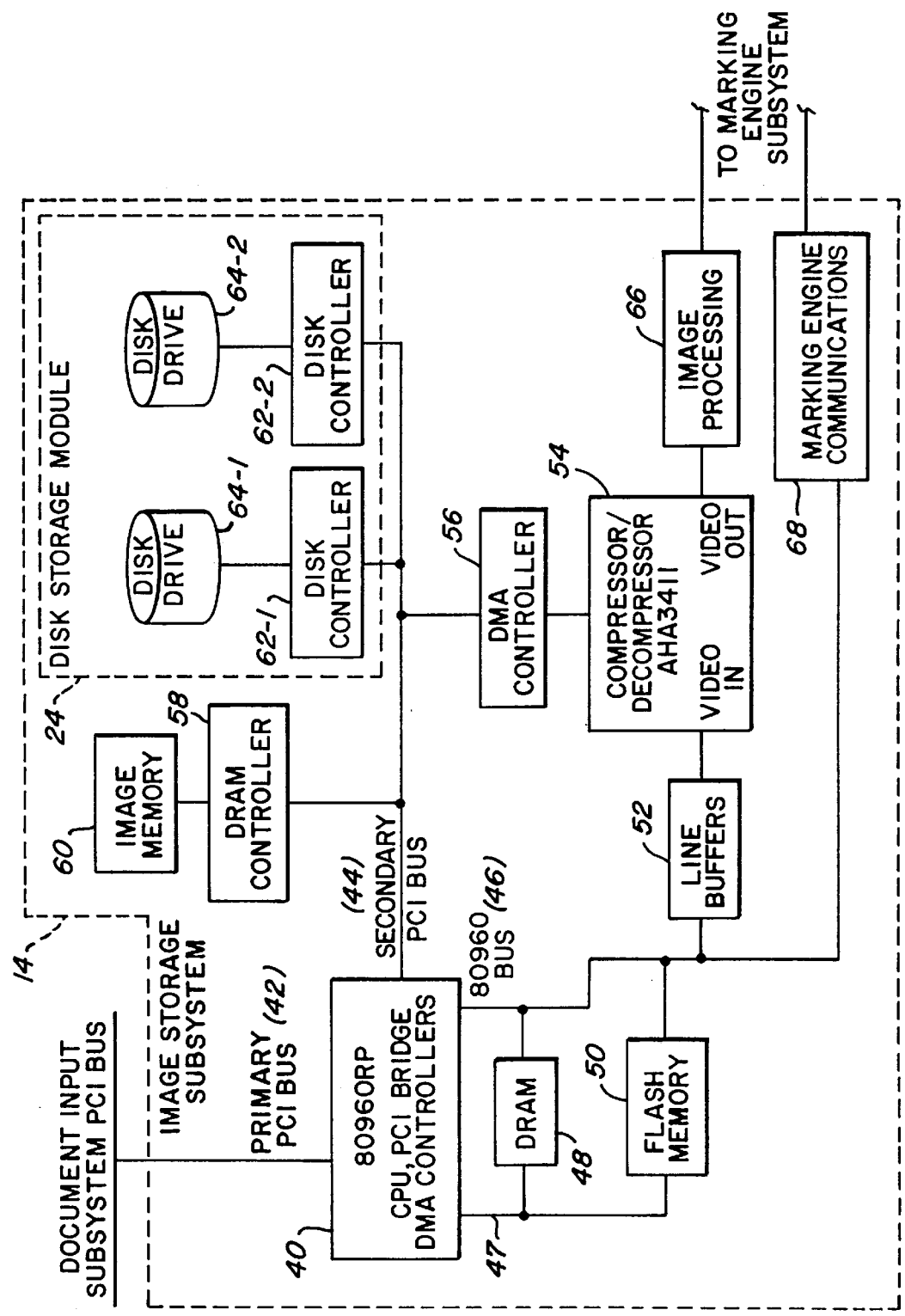
FIG. 3 shows a block-level diagram of the preferred embodiment of the image storage subsystem according to the invention.

FIG. 3 shows a preferred embodiment of the image storage subsystem 14. In the preferred embodiment, the interface between document input subsystem 12 and the image storage subsystem 14 is a primary PCI bus 42. Input images, whether rasterized by a RIP or acquired from a scanner are transferred over the PCI bus 42 into the image storage subsystem 14.

Figure 4:
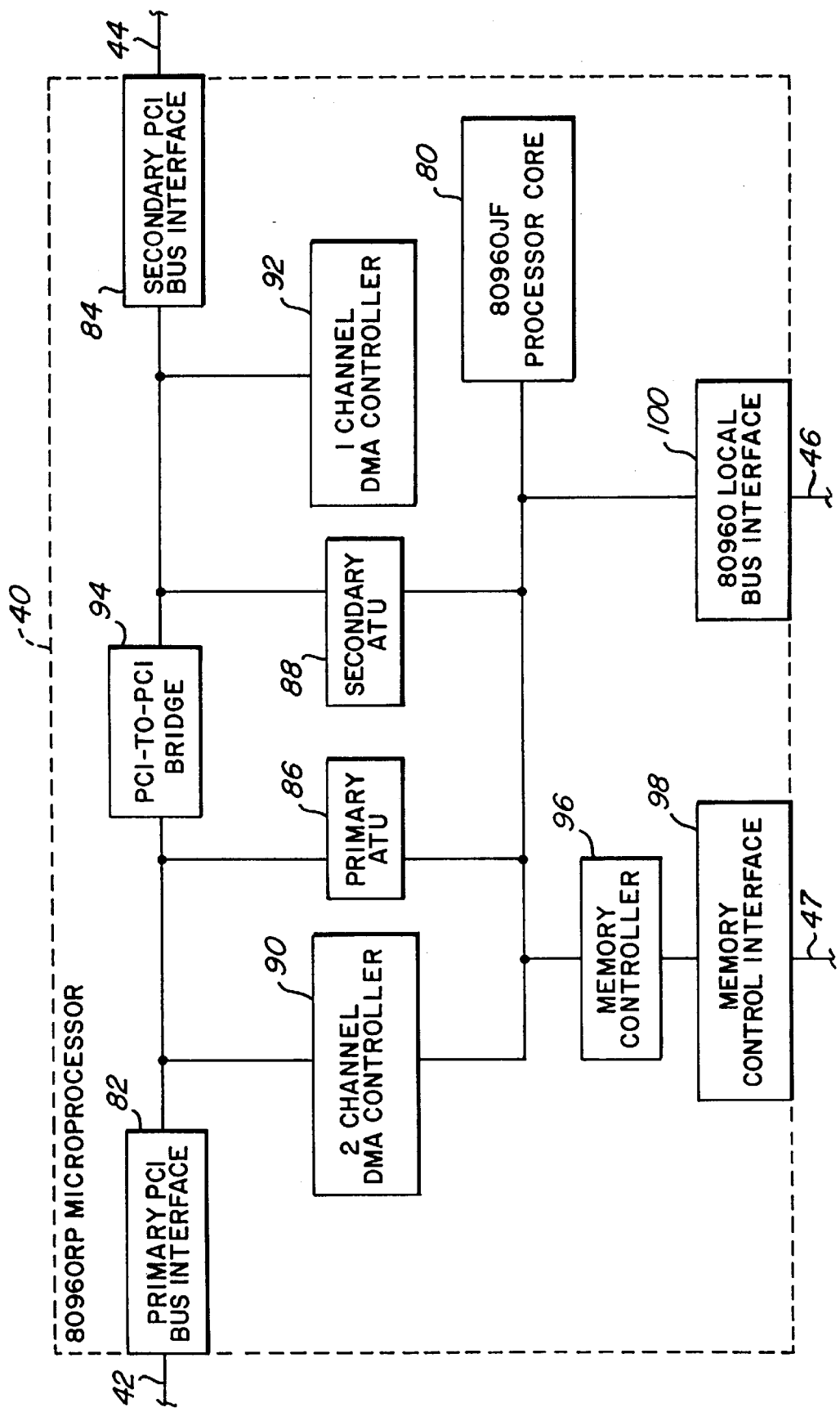
FIG. 4 shows the internal architecture of an Intel 80960RP microprocessor used in the preferred embodiment of the image storage subsystem of the invention.

The Intel 80960RP microprocessor 40 plays a central role in the functionality of the image storage subsystem 14. However, other microprocessors or computers may also be used. FIG. 4 shows the internal architecture of the Intel 80960RP microprocessor 40 which contains an 80960JF microprocessor core 80 integrated with a number of other peripheral devices. Chief among these are two PCI buses interfaces, the primary PCI bus interface 82 and the secondary PCI bus interface 84, which the core microprocessor 80 can access through the address translation units (ATUs) 86 and 88. Additionally, there are internal DMA controllers 90 and 92 that can be used to move data between the PCI buses interfaces 82 and 84 and the 80960 local bus interface 100. The device also includes a PCI-to-PCI bridge 94 for moving data between the two PCI bus interfaces 82 and 84. Finally, the 80960RP microprocessor 40 includes a memory controller 96 which can be used through the memory controller interface 98 and memory control signals 47 to provide appropriate control to directly connect external DRAM 48 and flash memory 50 to the 80960 local bus 46.

In the preferred embodiment, the three external buses (42, 44, 46) of the 80960RP microprocessor 40 are used as follows: the primary PCI bus 42 interfaces to the document input subsystem, the secondary PCI bus 44 is used to move compressed image data within the image storage subsystem 14, and the 80960 local bus 46 is used for loading images, program execution, and interfacing to the communications interface 68 to the marking engine subsystem 16.

The flash memory 50 stores the program code executed by the microprocessor core 80. The DRAM 48 holds temporary variables, stack data, and memory and disk allocation tables used by the program code in the operation of the image storage subsystem 14.

The line buffers 52 hold lines of the image as it is transferred into the image storage subsystem 14 prior to being compressed. In the preferred embodiment, the image compressor 20 and image decompressor 30 are combined into a single device, the Advanced Hardware Architectures AHA3411 compressor/decompressor 54. The compressor/decompressor 54 has video input and output ports over which the uncompressed data moves. Compressed data is transferred by the external DMA controller 56 through the DRAM controller 58 into the DRAM image memory 60 which in a preferred application is 64 megabytes (MB).

In the preferred embodiment, the disk storage module 24 is implemented using two disk controllers 62-1, 62-2 each of which interfaces to a single disk drive 64-1, 64-2 respectively. The disk controllers 62-1, and 62-2 and disk drives 64-1 and 64-2 may use the industry standard IDE/ATA interface or other known interface.

Decompressed data moves from the compressor/decompressor 54 through the image processing block 66 to the marking engine subsystem 16. In the image processing block 66, the image is shifted to the proper location in the print frame, corrected to compensate for non-uniformities in the printing process, and formatted appropriately for transmission to the marking engine subsystem 16. An additional semiconductor memory for assembling complete pages such as signatures may be provided as part of the image processing block as taught in Telle, U.S. application Ser. No. 08/655,550 or the assembled data for the signatures may be formed in the disk drives.

The marking engine communications block 68 implements a communications interface through which the image storage subsystem 14 communicates timing and control information with the marking engine subsystem 16. In the preferred embodiment this comprises an ARCnet interface for passing control messages and a timing bus for communicating timing information.

The operation of the image storage subsystem 14 is controlled by the microprocessor core 80. The microprocessor core 80 executes a program stored in the flash memory 50 which allows the image storage subsystem 14 to load images over the primary PCI bus interface 42 from the document input subsystem 12 and to retrieve images to be sent to the marking engine subsystem 16.

Images are loaded by programming the 80960RP DMA controller 90 to move the uncompressed image data from a location on the primary PCI bus 42 to the line buffers 52. The microprocessor core 80 also configures the compressor/decompressor 54 and the external DMA controller 56, as well as allocates space in the image memory 60 for the resultant compressed image data. As the 80960RP DMA controller 90 moves lines of the image into the line buffers 52, the data is transferred into the compressor/decompressor 54 where it is compressed and subsequently transferred by DMA accesses to the image memory 60. When the image compression is complete, the microprocessor core 80 receives interrupts from the 80960RP DMA controller 90, the compressor/decompressor 54 and the external DMA controller 56.

To move the compressed image data onto the disks of the disk drives 64-1, 64-2, the microprocessor core 80 first allocates storage space for the compressed image data. The microprocessor core 80 then programs DMA engines in the disk controllers 62-1, 62-2 to move the compressed image data from the image memory 60 to the disk drives 64-1, 64-2. When the transfer to the disks is complete, the microprocessor core 80 receives interrupts from the disk controllers 62-1, 62-2. The presence of multiple disk drives in the disk storage module 24 increases bandwidth of the disk storage module 24 because the bandwidth is limited by the time required to read and write information to a single disk. Where multiple disk drives are provided image data can be alternately read to the plural disks so that while data is stored in one disk controller and being written to one disk drive the next segment of data for the page can be stored in another disk controller for writing to its associated disk drive. The disk drive may be a mass storage device that records image data using magnetic recording or optical recording.

When the marking engine subsystem 16 is ready to print an image, a message is received by the marking engine communications interface 68 which causes an interrupt to the microprocessor core 80. The microprocessor core 80 determines the location on the disk drives 64 for the image requested, allocates space in the image memory 60 for the compressed image data, and programs the DMA engines in the disk controllers 62 to move the compressed image data from the disk drives 64-1, 64-2 to the image memory 60. When the transfer from the disk drives 64-1, 64-2 to the image memory 60 is complete, the microprocessor core 80 receives interrupts from the disk controllers 62-1, 62-2.

When the appropriate timing signals are received from the marking engine subsystem 16 via the marking engine communications interface 68 indicating that the marking engine is ready to print the image, the microprocessor core 80 receives an interrupt and configures the DMA controller 56 and decompressor within the compressor/decompressor 54 to transfer the compressed image data from the image memory 60 to the compressor/decompressor 54, decompress it, and send it to the image processing block 66. The microprocessor core 80 also configures the image processing block 66 to perform any required image manipulations such as shifting the image and performing non-uniformity compensation. The resultant image is then transferred to the marking engine subsystem 16 where it is printed. The microprocessor core 80 receives interrupts from the compressor/decompressor 54 and the image processing block 66 when the image transfer is complete.

Disk Bandwidth and Image Compression

To maintain maximum productivity of the marking engine subsystem 16, and hence the entire printing system 10, the image storage subsystem 14 must be able to transfer any image to the marking engine subsystem 16 whenever it is requested. To do this, the bandwidth of the disk storage module 24 must be sufficient to retrieve any image from the disk drives 28 in the time that it takes to print that image. The image storage subsystem 14 can then operate in a pipelined mode in which one image is transferred from the semiconductor image memory 22 to the decompressor 30, decompressed, and sent to the marking engine subsystem 16 while the next image to be printed is being transferred from the disk storage module 24 to the image memory 22. This mode of operation allows the image storage subsystem 14 to continuously deliver any stream of images to the marking engine subsystem 16, thereby allowing the marking engine subsystem 16 to run at full speed.

The compression algorithm used in the compressor 20 impacts the bandwidth required for the disk storage module 24. Lossless compression algorithms typically compress images by a ratio of at least 2:1, and compression ratios of 10:1 are not uncommon. However, certain images (lacking any patterns distinguishable by the compression algorithm) will not compress well. The compressor 20 may recognize such images and pass them through unchanged, or may even expand the images in the process of trying to compress them. If the algorithm used by the compressor 20 can expand the images, then the bandwidth of disk storage module 24 must be provided to take into account the largest (worst-case) compressed image size. Bandwidth may be increased by providing modules with faster read, write or access times or by providing additional disk drives and drive controllers in the disk storage module.

When worst-case compressed images are being retrieved from an image storage subsystem 14 containing a disk storage module 24 with this minimum data transfer bandwidth, the entire bandwidth of the disk storage module 24 is consumed with transferring data from the disk drives 28 to the image memory 22 in preparation for printing the images. In this case, there is no disk bandwidth available to place incoming images that have just been compressed on the disk drives 28. However, worst-case compressed images are the exception, rather than the norm. Generally, images will compress by at least 2:1, which means that less than half of the bandwidth of the disk storage module 24 will be used for retrieving images to be printed. The remaining disk bandwidth can then be made available to load incoming images into the disk storage module 24. Once again, since most images will compress by at least 2:1, the bandwidth needed for loading images into the disk storage module 24 will generally be less than the available bandwidth. Thus, in the typical case, the image storage subsystem 14 will be able to simultaneously load and retrieve images at the speed the marking engine subsystem 16 prints them. In the worst case, the image storage subsystem 14 will only retrieve images at the speed the marking engine subsystem 16 prints them.

In the preferred embodiment, the marking engine subsystem 16 can print 600 dots per inch (DPI) 8.5 inch by 14 inch images at 110 images per minute. Consequently, the maximum sustained speed at which decompressed images must be transferred to the marking engine subsystem 16 is 9.8 megabytes per second (MB/s). Since the compressor/decompressor 54 uses an algorithm that expands worst-case images by a ratio of 8:9, the disk storage module 24 must be capable of sustaining a transfer rate of 11.0 MB/s. With a disk storage module 24 capable of sustained transfers at that rate, the image storage subsystem 14 will always be able to transfer images to the marking engine subsystem 16 when requested.

In the preferred embodiment the image memory 60 of 64 MB is sufficient to store in compressed form (worst case) seven images of 11 inch×17 inch size. The memory 60 may be operated so that up to three 11 inch×17 inch pages are reserved for storing pages to be input to the disk storage module and up to four 11 inch×17 inch pages are reserved for storing output from the disk storage module.

It will be noted that the secondary PCI bus 44 carries compressed image data only. The compressed image data is carried on this bus from the compressor 54 to the image memory 60, from the image memory 60 to the disk storage module 24, from the disk storage module 24 to the image memory 60 and form the image memory 60 to the decompressor 54. Where bandwidth considerations permit the process of moving image data may be such that a segment of data is moved from disk storage module 24 to image memory 60 and then is followed by a segment of data of a different page that is moved from image memory 60 to the compressor 54. Thus data of small segments of different pages are moved successively between the image memory, the disk storage module 24 and the compressor/decompressor 54. Expanded or uncompressed image data appears only on the primary PCI bus 42, the local bus 46 and the video input and video output lines of compressor/decompressor 54. The presence of only compressed data on the secondary PCI bus 44 conserves bandwidth on the bus 44 since most pages will compress efficiently.

In accordance with the invention the number of disk drives required in the disk storage module to always be able to transfer decompressed images to the printer when requested regardless of how well the images were compressed can be determined from the following formula:

$$N=(S*R*C)/(D*60)$$

wherein N is the number of disk drives rounded up to the next largest integer and typically for high speed, high resolution printers N will be two or more disk drives;

S is the image size (uncompressed) in megabytes of a given page size; and

R is the printing page rate in pages per minute for the page of the given page size.

Because the printer may have different requirements for printing pages of different size papers and thus different products of S*R, the product S*R in the above formula is the worst-case product (resulting in the highest value of N).

C is the worst case compression ratio of the compressor; and

D is the sustained disk bandwidth (megabytes per second) of a disk drive in the disk storage module.

The invention has been described in detail with particular reference to certain preferred embodiments thereof, but it will be understood that variations and modifications can be effected within the spirit and scope of the invention.

What is claimed is:

1. A printer apparatus comprising:
    a marking engine subsystem for recording information on an image recording member at a maximum sustainable data recording rate; and
    an image storage subsystem for buffering image data for output to the marking engine subsystem, the image storage subsystem including:
        (a) an input for receiving rasterized image data;
        (b) a data compressor that operates on the rasterized image data to compress the rasterized image data to form compressed imae data;
        (c) a disk storage module that receives, stores and outputs the compressed image data;
        (d) a semiconductor RAM memory device that stores at least one page of the compressed data;
        (e) a data decompressor that operates on the compressed data output by the RAM memory device and decompresses the compressed data to decompressed rasterized image data for output to the marking engine subsystem;
        (f) a RAM controller that controls the RAM memory device for outputting the compressed data from the RAM memory device to the decompressor, the disk storage module outputting the compressed data to the RAM memory device at a data rate fast enough, even for worst-case images where the compressed data for an image is greater than the decompressed data for that image, so that when the data is decompressed, the decompressed rasterized image data is available to the marking engine so as to allow the marking engine to operate at the maximum sustainable data recording rate of the marking engine subsystem; and
    the disk storage module has N disk drives, wherein N is determined by the formula:

$$N=(S*R*C)/(D*60)$$

wherein S is the image size uncompressed in megabytes of a page of a given page size, R is the maximum sustainable printing page rate for the page of the given page size, wherein the product S*R is the worst case product resulting in the highest value for N for the apparatus, C is the worst case compression ratio of the compressor, and D is the sustained disk bandwidth in megabytes per second of a disk drive in the disk storage module.

2. The apparatus of claim 1 wherein the input for receiving rasterized image data includes a first input bus, the RAM memory device is connected to a second bus, the compressor and the decompressor are connected to the second bus, and the disk storage module is connected to the second bus for moving compressed data from the compressor to the RAM memory device, from the RAM memory device to the disk storage module and from the RAM memory device to the decompressor so that only compressed image data is provided on the second bus.

3. The apparatus of claim 2 wherein the disk storage module has N disk drives wherein N is determined by the formula:

$$N=(S*R*C)/(D*60)$$

wherein S is the image size uncompressed in megabytes of a page of a given page size, R is the maximum sustainable printing page rate for the page of the given page size, wherein the product S*R is the worst case product resulting in the highest value for N for the apparatus, C is the worst case compression ratio of the compressor, and D is the sustained disk bandwidth in megabytes per second of a disk drive in the disk storage module.

4. The apparatus of claim 3 wherein decompressed image data is output from the decompressor on a third bus.

5. The apparatus of claim 4 wherein the compressor is of a type that compresses the image data using a lossless compression algorithm.

6. The apparatus of claim 2 wherein decompressed image data is output from the decompressor on a third bus.

7. The apparatus of claim 1 wherein the compressor is of a type that compresses the image data using a lossless compression algorithm.

8. A printer apparatus comprising:
    means for recording information on an image recording member at a maximum sustainable data recording rate; and
    an image storage subsystem for buffering image data for output to a marking engine subsystem, the image storage subsystem including:
        (a) an input for receiving rasterized image data;
        (b) a data compressor means that operates on the rasterized image data to compress the rasterized image data to form compressed image data;
        (c) a disk storage module that receives, stores and outputs the compressed image data;
        (d) a semiconductor RAM memory device that stores at least one page of the compressed data;
        (e) a data decompressor means that operates on the compressed data output by the RAM memory device and decompresses the compressed data to rasterized data for output to the marking engine subsystem;
        (f) control means for controlling the RAM memory device for outputting the compressed data from the RAM memory device to the decompressor means, the disk storage module outputting the compressed data to the RAM memory device at a data rate greater, even for worst case images, than the maximum sustainable data recording rate of the marking engine subsystem;

the disk storage module has N disk drives wherein N is determined by the formula:

$$N=(S*R*C)/(D*60)$$

wherein S is the image size uncompressed in megabytes of a page of a given page size, R is the maximum sustainable printing page rate for the page of the given page size, wherein the product S*R is the worst case product resulting in the highest value for N for the apparatus, C is the worst case compression ratio of the compressor means, and D is the sustained disk bandwidth in megabytes per second of a disk drive in the disk storage module.

9. The apparatus of claim 8 wherein the input for receiving rasterized image data includes a first input bus, the RAM memory device is connected to a second bus, the compressor means and the decompressor means are connected to the second bus, and the disk storage module is connected to the second bus for moving compressed data from the compressor means to the RAM memory device, from the RAM memory device to the disk storage module and from the RAM memory device to the decompressor means so that only compressed image data is provided on the second bus.

10. The apparatus of claim 8 wherein decompressed image data is output from the decompressor means on a third bus.

11. The apparatus of claim 10 wherein the disk storage module has N disk drives wherein N is determined by the formula:

$$N=(S*R*C)/(D*60)$$

wherein S is the image size uncompressed in megabytes of a page of a given page size, R is the maximum sustainable printing page rate for the page of the given page size, wherein the product S*R is the worst case product resulting in the highest value for N for the apparatus, C is the worst case compression ratio of the compressor means and D is the sustained disk bandwidth in megabytes per second of a disk drive in the disk storage module.

12. The apparatus of claim 11 wherein the compressor means is of a type that compresses the image data using a lossless compression algorithm.

13. A method of operating an image storage subsystem for output of image data to a marking engine subsystem for recording information on an image recording member at a maximum sustainable data recording rate, the method comprising
    (a) inputting rasterized image data to a data compressor device;
    (b) compressing the rasterized image data to form compressed image data;
    (c) storing the compressed image data in a disk storage module;
    (d) outputting the compressed image data from the disk storage module to a semiconductor RAM memory device that stores at least one page of the compressed image data;
    (e) decompressing the compressed data to decompressed rasterized image data for output to the marking engine subsystem;
    wherein the disk storage module outputs the compressed image data to the RAM memory device at a data rate fast enough, even for worst-case images where the compressed data for an image is greater than the decompressed data for that image, so that when the data is decompressed the decompressed rasterized image data is available to the marking engine so as to allow the marking engine to operate at the maximum sustainable data recording rate of the marking engine subsystems
    the disk storage module has N disk drives wherein N is determined by the formula:

$$N=(S*R*C)/(D*60)$$

wherein S is the image size uncompressed in megabytes of a page of a given page size, R is the maximum sustainable printing page rate for the page of the given page size, wherein the product S*R is the worst case product resulting in the highest value for N for the marking engine subsystem, C is the worst case compression ratio of the compressor device, and D is the sustained disk bandwidth in megabytes per second of a disk drive in the disk storage module.

14. The method of claim 13 and including inputting the rasterized image data on a first bus to the data compressor device; outputting the compressed image data from the compressor device onto a second bus and inputting the compressed image data to the semiconductor RAM memory device; outputting the compressed image data from the RAM memory device to the second bus and inputting the compressed image data to the disk storage module; outputting the compressed image data from the disk storage module to the second bus and inputting the compressed image data into the semiconductor RAM memory device that stores at least one pae of the compressed data; outputting the compressed image data stored in the semiconductor RAM memory device that was received from the disk storage module onto the second bus and inputting the compressed image data to a data decompressor device; expanding the compressed image data to form rasterized image data; outputting the rasterized image data on a third bus; and wherein only the compressed image data is provided on the second bus.

15. The method of claim 14 wherein the compressor device compresses the image data using a lossless compression algorithm.

16. The method of claim 13 wherein the compressor device compresses the image data using a lossless compression algorithm.

17. A printer apparatus comprising:
    a marking engine subsystem for recording information on an image recording member at a maximum sustainable data recording rate; and
    an image storage subsystem for buffering image data for output to the marking engine subsystem, the image storage subsystem including:
    (a) an input for receiving rasterized image data;
    (b) a data compressor that operates on the rasterized image data to compress the rasterized image data to form compressed image data;
    (c) a disk storage module that receives, stores and outputs the compressed image data;
    (d) a semiconductor RAM memory device that stores at least one page of the compressed data;
    (e) a data decompressor that operates on the compressed data output by the RAM memory device and decompresses the compressed data to decompressed rasterized image data for output to the marking engine subsystem;
    (f) a RAM controller that controls the RAM memory device for outputting the compressed data from the RAM memory device to the decompressor, the disk storage module outputting the compressed data to the RAM memory device at a data rate fast enough so that when the data is decompressed, the decompressed rasterized image date is available to the marking engine so as to allow the marking engine to operate at the maximum sustainable data recording rate of the marking engine subsystem;

wherein the input for receiving the rasterized image data includes a first input bus, the RAM memory device is connected to a second bus, the compressor and the decompressor are connected to the second bus, and the disk storage module is connected to the second bus for the moving the compressed data from the compressor to the RAM memory device, from the RAM memory device to the disk storage module and from the RAM memory device to the decompressor so that only the compressed image data is provided on the second bus; and wherein the disk storage module has N disk drives, wherein N is determined by the formula:

$$N=(S*R*C)/(D*60)$$

wherein S is the image size uncompressed in megabytes of a page of a given page size, R is the maximum sustainable printing page rate for the page of the given page size, wherein the product S*R is the worst case product resulting in the highest value for N for the apparatus, C is the worst case compression ratio of the compressor, and D is the sustained disk bandwidth in megabytes per second of a disk drive in the disk storage module.

18. The apparatus of claim 17 wherein the decompressed image data is output from the decompressor on a third bus.

19. The apparatus of claim 18 wherein the compressor is of a type that compresses the image data using a lossless compression algorithm.

20. A printer apparatus comprising:

a marking engine subsystem for recording information on an image recording member at a maximum sustainable data recording rate; and an image storage subsystem for buffering image data for output to the marking engine subsystem, the image storage subsystem including:

(a) an input for receiving rasterized image data;

(b) a data compressor that operates on the rasterized image data to compress the rasterized image data to form compressed image data;

(c) a disk storage module that receives, stores and outputs the compressed image data, (d) a semiconductor RAM memory device that stores at least one page of the compressed data;

(e) a data decompressor that operates on the compressed data output by the RAM memory device and decompresses the compressed data to decompressed rasterized image data for output to the marking engine subsystem; and (f) a RAM controller that controls the RAM memory device for outputting the compressed data from the RAM memory device to the decompressor, the disk storage module outputting the compressed data to the RAM memory device at a data rate fast enough so that when the data is decompressed, the decompressed rasterized image date is available to the marking engine so as to allow the marking engine to operate at the maximum sustainable data recording rate of the marking engine subsystem; and wherein the disk storage module has N disk drives, wherein N is determined by the formula:

$$N=(S*R*C)/(D*60)$$

wherein S is the image size uncompressed in megabytes of a page of a given page size, R is the maximum sustainable printing page rate for the page of the given page size, wherein the product S*R is the worst case product resulting in the highest value for N for the apparatus, C is the worst case compression ratio of the compressor and D is the sustained disk bandwidth in megabytes per second of a disk drive in the disk storage module.

21. The apparatus of claim 20 wherein the decompressed image data is output from the decompressor on a third bus.

22. The apparatus of claim 21 wherein the compressor is of a type that compresses the image data using a lossless compression algorithm.

23. The apparatus of claim 20 wherein the compressor is of a type that compresses the image data using a lossless compression algorithm.

24. A printer apparatus comprising;

means for recording information on an image recording member at a maximum sustainable data recording rate; and an image storage subsystem for buffering image data for output to a marking engine subsystem, the image storage subsystem including:

(a) an input for receiving rasterized image data;

(b) a data compressor means that operates on the rasterized image data to compress the rasterized image data to form compressed image data;

(c) a disk storage module that receives, stores and outputs the compressed image data;

(d) a semiconductor RAM memory device that stores at least one page of the compressed data;

(e) a data decompressor means that operates on the compressed data output by the RAM memory device and decompresses the compressed data to rasterized data for output to the marking engine subsystem; and (f) control means for controlling the RAM memory device for outputting the compressed data from the RAM memory device to the decompressor means, the disk storage module outputting the compressed data to the RAM memory device at a data rate greater than the maximum sustainable data recording rate of the marking engine subsystem; and wherein the disk storage module has N disk drives, wherein N is determined by the formula:

$$N=(S*R*C)/(D*60)$$

wherein S is the image size uncompressed in megabytes of a page of a given page size, R is the maximum sustainable punting page rate for the pane of the given page size, wherein the product S*R is the worst case product resulting in the highest value for N for the apparatus, C is the worst case compression ratio of the compressor, and D is the sustained disk bandwidth in megabytes per second of a disk drive in the disk storage module.

25. The apparatus of claim 24 wherein the decompresed image data is output from the decompressor means on a third bus.

26. The apparatus of claim 24 wherein the input for receiving rasterized image data includes a first input bus, the RAM memory device is connected to a second bus, the compressor means and the decompressor means are connected to the second bus, and the disk storage module is connected to the second bus for moving the compressed data from the compressor means to the RAM memory device, from the RAM memory device to the disk storage module and from the RAM memory device to the decompressor means so that only the compressed image data is provided on the second bus.

27. The apparatus of claim 26 wherein the compressor mans is of a type that compresses the image data using a lossless compression algorithm.

28. A method of operating an image storage subsystem for output of image data to a marking engine subsystem for recording information on an image recording member at a maximum sustainable data recording rate, the method comprising:

(a) inputting rasterized image data to a data compressor device;

(b) compressing the rasterized image data to form compressed image data;

(c) stoning the compressed image data in a disk storage module;

(d) outputting the com-pressed image data from the disk storage module to a semiconductor RAM memory device that stores at least one page of the compressed image data;

(e) decompressing the compressed data to decompressed rasterized image data for output to the marking engine subsystem;

wherein the disk storage module outputs the compressed image data to the RAM memory device at a data rate fast enough so that when the data is decompressed, the decompressed rasterized image data is available to the marking engine so as to allow the marking engine to operate at the maximum sustainable data recording rate of the marking engine subsystem; and wherein the disk storage module has N disk drives, wherein N is determined by the formula:

$$N=(S*R*C)/(D*60)$$

wherein S is the image size uncompressed in megabytes of a page of a given page size, R is the maximum sustainable printing page rate for the page of the given page size, wherein the product S*R is tie worst case product resulting in the highest value for N for the marking engine subsystem, C is the worst case compression ratio of the compressor device that compresses the rasterized image data, and D is the sustained disk bandwidth in megabytes per second of a disk drive in the disk storage module.

29. The method of claim 28 wherein the compressor device compresses the image data using a lossless compression algorithm.

30. The method of claim 28 and including inputting the rasterized image data on a first bus to the data compressor device; outputting the compressed image data from the compressor device onto a second bus and inputting the compressed image data to the semiconductor RAM memory device; outputting the compressed image data from the RAM memory device to the second bus and inputting the compressed image data to the disk storage module; outputting the compressed image data from the disc storage module to the second bus and inputting the compressed image data into the semiconductor RAM memory device that stores at least one page of the compressed data; outputting the compressed image data stored in the semiconductor RAM memory device that was received from the disk storage module onto the second bus and inputting the compressed image data to the data decompressor device; expanding the compressed image data to form rasterized image data; outputting the rasterized image data on a third bus; and wherein only the compressed image data is provided on the second bus.

31. The method of claim 30 wherein the compressor device compresses the image data using a lossless compression algorithm.

* * * * *